United States Patent [19]

Conti

[11] Patent Number: 4,553,021

[45] Date of Patent: Nov. 12, 1985

[54] PINCER-GUN FOR ELECTRICALLY HEATING METAL HINGES OF THERMOPLASTIC EYEGLASS FRAMES

[76] Inventor: Gianfranco Conti, Viale Corsica, 39 Milano, Italy

[21] Appl. No.: 440,025

[22] Filed: Nov. 8, 1982

[30] Foreign Application Priority Data

May 10, 1982 [IT] Italy .............................. 21165 A/82

[51] Int. Cl.⁴ .......................... B23K 9/28; B23K 3/04; H05B 3/02
[52] U.S. Cl. .............................. 219/234; 219/85 CA; 219/90; 219/230; 219/235; 219/240; 264/36
[58] Field of Search ........ 219/221, 227, 229, 230–235, 219/240, 90, 85 CA, 85 CM; 264/36

[56] References Cited

U.S. PATENT DOCUMENTS

| | | | |
|---|---|---|---|
| 2,449,521 | 9/1948 | Warner | 219/234 X |
| 2,513,431 | 7/1950 | Sell | 219/234 X |
| 2,623,152 | 12/1952 | Ammon | 219/234 |
| 2,790,059 | 4/1957 | Burnett | 219/234 X |
| 2,844,697 | 7/1958 | Emmerson | 219/234 |
| 3,354,478 | 11/1967 | Allen | 219/234 X |
| 3,673,384 | 6/1972 | Burman et al. | 219/230 |
| 3,752,017 | 8/1973 | Lloyd et al. | 219/234 X |
| 3,804,320 | 4/1974 | Vandermark | 219/230 X |
| 3,820,221 | 6/1974 | Mercer | 219/234 X |
| 3,924,332 | 12/1975 | Rauch et al. | 219/234 X |
| 4,034,202 | 7/1977 | Vandermark | 219/230 |

FOREIGN PATENT DOCUMENTS

| | | | |
|---|---|---|---|
| 911957 | 4/1946 | France | 219/234 |
| 945402 | 12/1963 | United Kingdom | 219/230 |

*Primary Examiner*—A. Bartis
*Attorney, Agent, or Firm*—Michael J. Striker

[57] ABSTRACT

A manually operated pincer-gun utilizing electric current for heating metal hinges of a thermoplastic eyeglass frame during a repair operation includes a pair of electrically insulative hand grips, each operatively connected to an arm having an electrically conductive extremity. The hand grips are pivotally connected together such that the hand grips and the respective arms and extremities are movable toward each other. An electrically conductive heating tip and an electrically conductive picking-up tip are provided on the extremity of each arm and the secondary of a step-down transformer controlled by a pedal switch is connected to the respective extremities to supply heating current to the heating and picking-up tips. The heating tips form a pair of pins extending substantially parallel to each other to be able to be placed on the base of the hinge to apply electric heating current thereto to soften the eyeglass frame around the hinge for insertion or extraction of the hinge. The picking-up tips form opposing tapered heads able to penetrate into the eyeholes of a hinge to apply heating current thereto. One of the extremities is provides with an extracting tip having a sharp end tooth extending perpendicularly outwardly therefrom. The heating tips are disposed at a 90° angle relative to the picking-up tips and the hand grips are biased away from each other to keep the tips and extremities apart.

13 Claims, 14 Drawing Figures

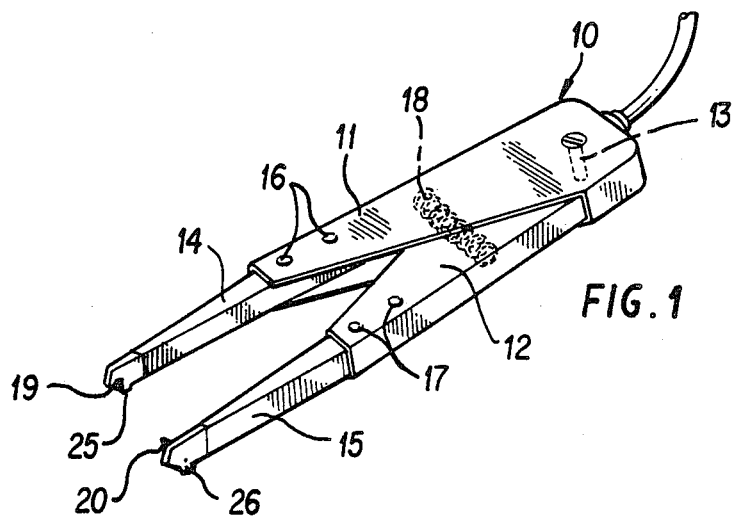
FIG. 1
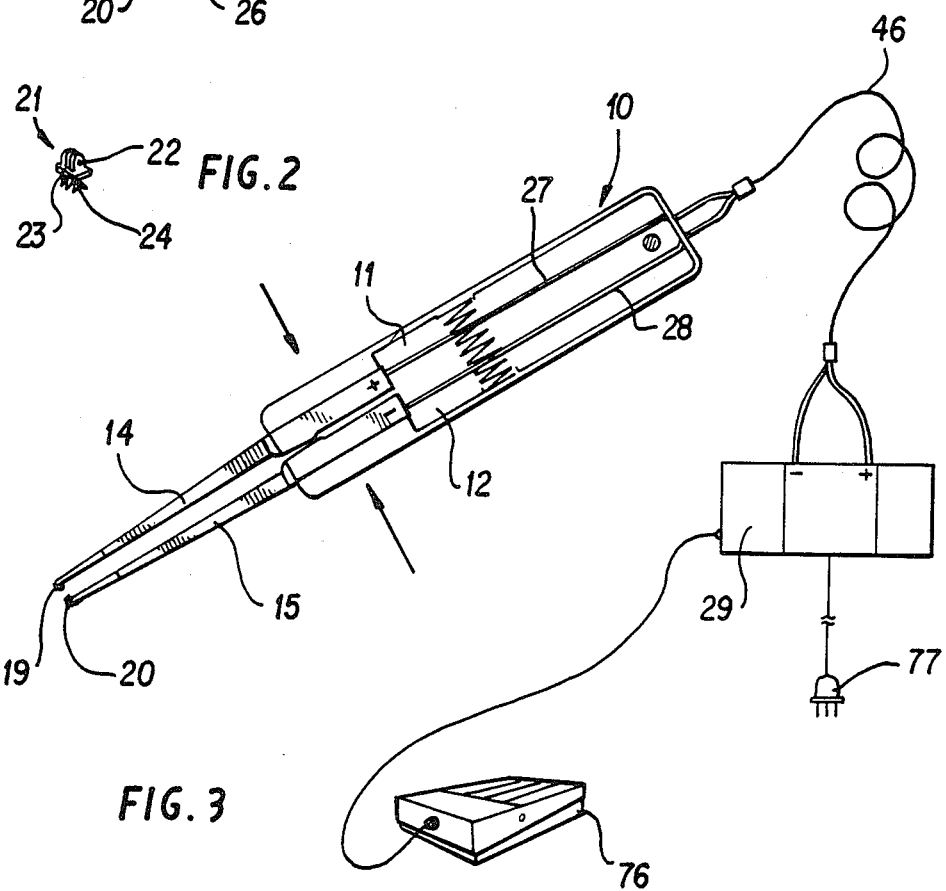
FIG. 2
FIG. 3

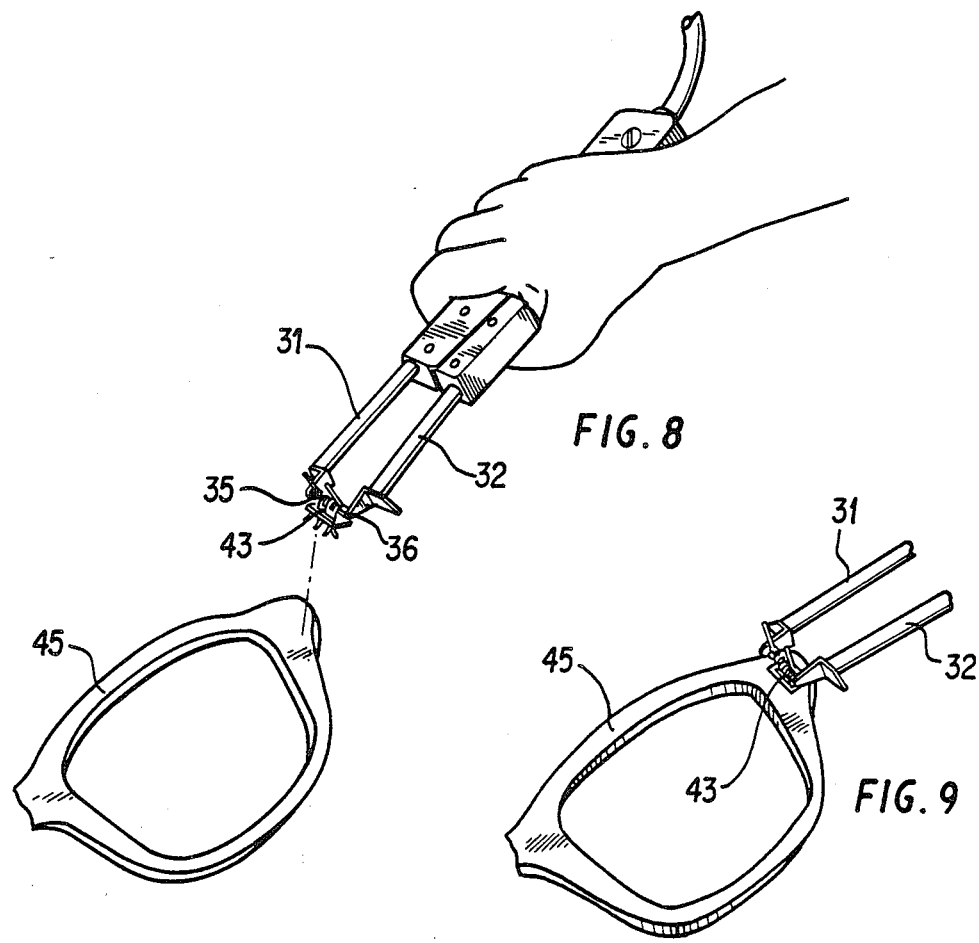
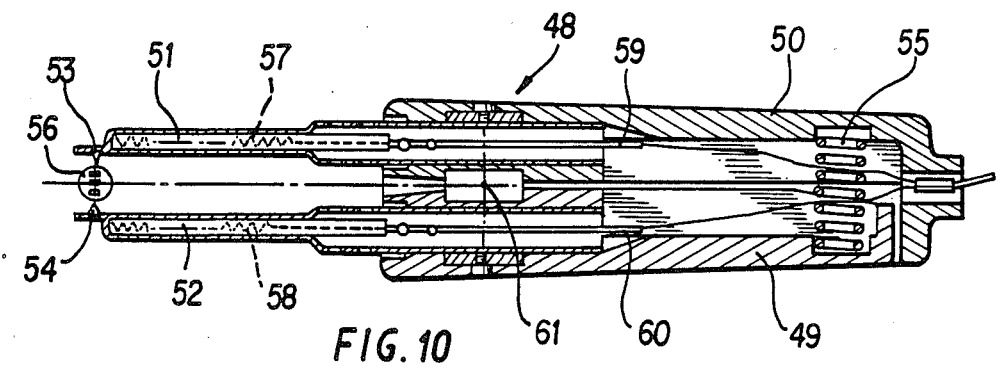

PINCER-GUN FOR ELECTRICALLY HEATING METAL HINGES OF THERMOPLASTIC EYEGLASS FRAMES

BACKGROUND OF THE INVENTION

The work of mounting hinges onto ordinary spectacle frames of thermoplastic material is usually done by presses designed to hold the frames and the hinges and adopting devices for their mechanical cohesion by means of mechanical and physical phenomena.

These presses are complex, costly, not suited to all types of frames and hinges, and are mainly employed in the manufacture of spectacle frames. They are therefore not suitable for the small workshop principally engaged in repairs involving replacement of hinges, especially considering the many differences there are between one kind of spectacle frame and another.

The present invention simplifies these operations, eliminating existing drawbacks while also offering some interesting advantages as will be described below.

SUMMARY OF THE INVENTION

The invention consists of a hand-held tool suitable both for mounting hinges onto thermoplastic spectacle frames and for replacing faulty hinges with new ones. The tool takes the form of a hand-operated pincer-type gun the jaws of which contain an electric circuit that, due to resistance, heats either the hinges to be mounted or those to be taken out.

The heated hinge softens the material of the frame making possible application or replacement of the hinge merely by pushing the hinge in or pulling it out.

The hinges become heated because the electric circuit is closed by means of the hinge itself which heats up because of electrical resistance.

The jaws have tapered counterposed picking-up tips which penetrate inside the eyeholes of the hinge to be mounted and exercising sufficient friction on their edges to hold the hinge firmly in the best working position.

The heating tips of the jaws are fine enough to enable both of them to simultaneously touch hinge already in the frame or to be replaced, without touching the frame itself.

In this way the electric circuit can be closed through the hinge due for replacement.

At the end of one of the jaws there is a sharp tooth shaped so as to penetrate between the frame and the hinge to be replaced, and to be used as a lever to help extract the hinge.

Jaw articulation is posterior so that hand pressure is applied between the articulation and the ends of the jaws, while an elastic device holes the gun "open" when out of use.

Electric current is supplied to the jaws by connecting them to the secondary circuit of a transformer. The electric circuit is completed by means of a foot-operated switch.

In another preferred type of execution the hinge is heated by conduction from the jaws themselves heated by electric elements placed inside them.

In a third type the hinges are heated by conduction from heads fixed to the jaws made of appropriate material and sized so as to act as electric heating elements. The characteristics and purposes of the invention will appear even clearer by the examples of execution now to be described and illustrated by diagrammatic figures.

BRIEF DESCRIPTION OF THE DRAWINGS

FIG. 1 is a perspective view showing the welding gun of the present invention idle;

FIG. 2 is a perspective view of a hinge to be mounted on the spectacle frames;

FIG. 3 is a longitudinal section of the gun shown in FIG. 1 and connected to the transformer;

FIG. 8 is a perspective view of the gun closed around a new hinge;

FIG. 9 is a perspective view of the mounting of the new hinge;

FIG. 10 is a longitudinal section of a gun with electric heating elements inside the jaws and with central articulation;

DETAILED DESCRIPTION OF THE PREFERRED EMBODIMENTS

Figure 4:
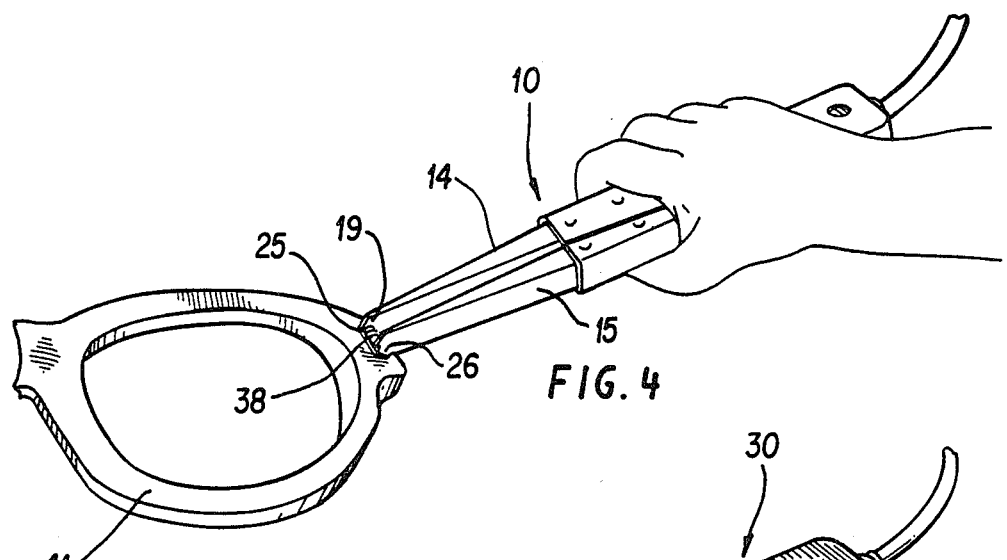
FIG. 4 is a perspective view of the present invention of FIG. 1 heating a broken hinge.

The gun (10) consists of two parts (11) and (12) both composed of plastic material and held together by a pin (13) and biased apart by a compression spring (18). Screws (16) and (17) serve to fix parts 11 and 12 to the metal jaws (14) and (15). To these jaws are fitted the aligned and counterposed tapered picking-up tips (19) and (20), whose maximum diameter is greater than the width of eyeholes (22) of an ordinary hinges (21)—see also FIG. 2—provided with a base (23) and hooks (24). There are tooth-like projections (25) and (26) at the ends of the jaws. These tooth-like projections serve as heating tips. The secondary of transformer 29 is connected to the jaws by wires (27) and (28) and the primary of the transformer is connected to a power supply by plug (77). The transformer 29 is a step-down transformer with a low voltage secondary.

Figure 12:
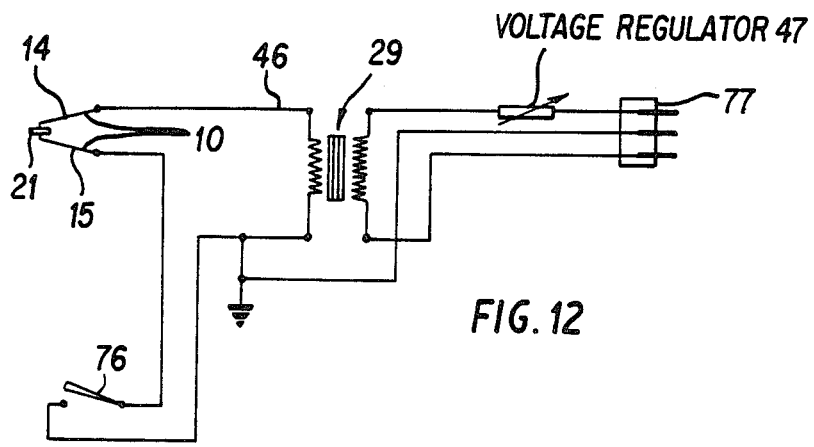
FIGS. 12, 13, 14 are jaw wiring diagrams.

The electric circuit is closed by the pedal switch (76). The wiring diagram in FIG. 12 shows the secondary circuit (46) of the transformer, the voltage regulator (47), the plug (77) and the other components indicated by the same numbers in the preceding figures.

Figure 5:
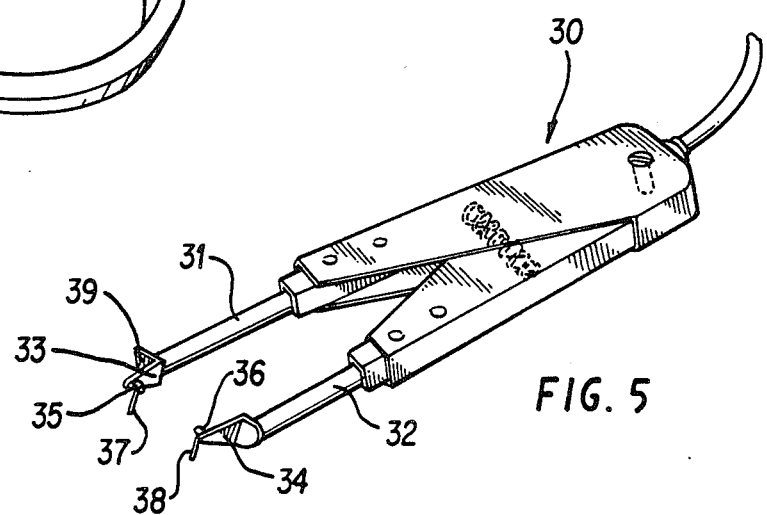
FIG. 5 is a perspective view of a second type of gun with more projecting picking-up tips.

The gun (30) illustrated in FIG. 5 is mainly the same as that already described, having tubular shaped jaws (31) and (32) with end heads (33) and (34) ending in tapered picking-up tips (35) and (36) that project further outwards than those of the previous gun.

The heating tips (25) and (26) on the gun seen in FIG. 1 are here replaced by the pin-like heating tips (37) and (38) which serve as the heating tips and project from the tapered picking-up tips, as shown in FIG. 5.

Another tooth (39), used for extraction of the broken hinges, as will be described, is fitted to the head (33).

Operation

Figure 6:
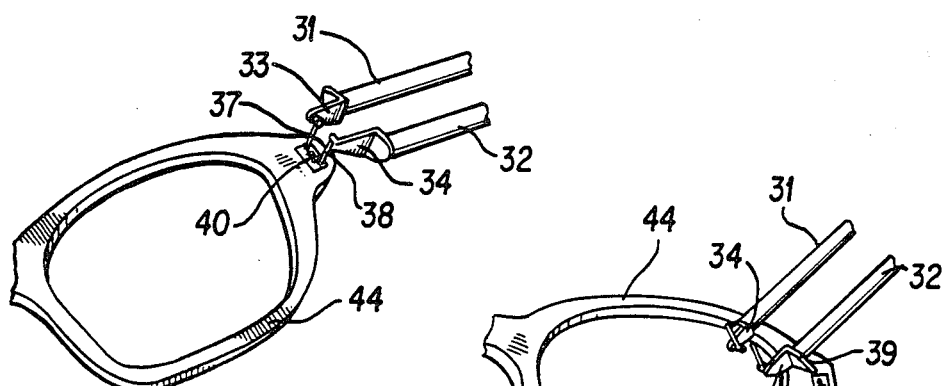
FIG. 6 is a perspective view of the present invention of FIG. 5 heating a hinge.

The gun (10), held half open, is placed in position (FIG. 4) so as to ensure contact of the heating tips (25) and (26) with the broken hinge (40) to be removed from a spectacle frame (41). By depressing the pedal (76) the electric circuit is completed through the hinge which, acting as a resistance element, heats up. The gun (30) behaves in a similar manner, as seen in FIG. 6. By making contact with the broken hinge (40) on the frame (44), heating tips (37), (38) bring about completion of the electric circuit and cause the hinge to heat up.

The hot hinge softens the thermoplastic material of the frame making it possible to lift out the hinge.

Figure 7:
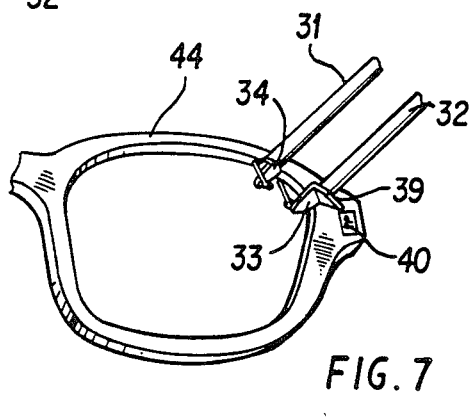
FIG. 7 is a perspective view of the extraction of the broken hinge.

By inserting the tang (39)—FIG. 7—between the frame and the hinge, the hinge is removed from the frame.

The following procedure is used to mount a new hinge (43). Having made the gun (FIG. 8) pick up the new hinge, by causing the tapered picking-up tips (35) and (36) to pass through eyeholes of the new hinge (43), the pedal is depressed and through the gun slight pressure is exercised on the hinge which will cause the new hinge to penetrate (FIG. 9) into the plastic material of the frame (45) when the latter becomes softened by the hot hinge. The foot then releases the pedal but contact is maintained for an instant or two between the gun and the hinge. After detaching the gun, the hinge will remain firmly fixed in the spectacle frame since the plastic material resolidifies rapidly.

FIG. 10 shows another embodiment of a gun (48) consisting of two parts (49) and (50) with a central fulcrum (61) and tubular metal jaws (51) and (52) fitted with heads (53) and (54).

When out of use, a posterior compression spring (55) keeps the jaws closed.

To insert a hinge (56) all that is needed is to tighten the grip on the gun and the jaws will open.

Figure 11:
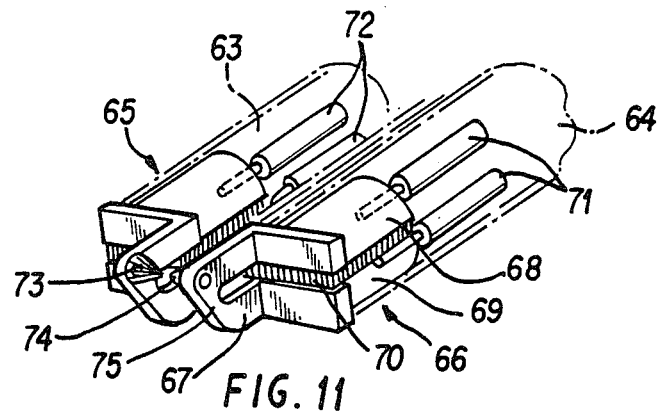
FIG. 11 is a perspective view of the ends of the jaws with highly resistive head.

By loosening the hand grip the jaws will then close. The hinge is heated by conduction through the electrical heating elements (57) and (58) placed inside the jaws, connected to the transformer by wires (59) and (60). FIG. 11 shows a type of gun in which the hinge is heated by heads (65), (66) placed at the ends of tubular jaws (63), (64) and fitted with tapered picking-up tips (73) and (74) for holding the hinge.

Each head is formed of a NI-CR plate comprising a bridge (67) fixed at its two ends to semi-cylindrical brass blocks (68), (69) separated by an insulating strip of mica (70). These blocks, fitted into the ends of the jaws, may be made of aluminum and be thickly oxidized to make them externally electrically insulative. Blocks (68) and (69) are connected by wires (71) and (72) to the secondary circuit of the transformer. A narrow point (75) in the bridge (67) ensures the optimum concentration of heat.

Figure 13:
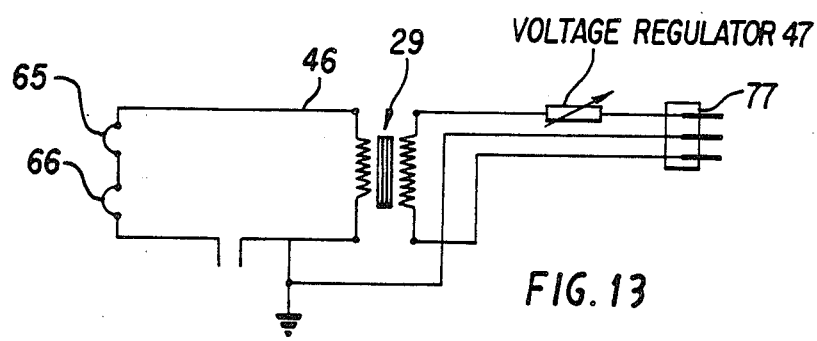
Figure 14:
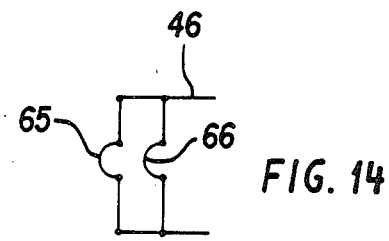

FIGS. 13 and 14 show two variations, of the wiring diagram shown in FIG. 12, for suppling current to the heads (65), (66) in FIG. 11 through the secondary circuit (46) of the transformer (29). See FIG. 12.

In FIG. 13 the heads are connected "in series" while in FIG. 14 they are connected "in parallel".

Advantages

The advantages of the invention are clear.

Extraction of broken hinges and fitting of new ones using a simple hand-held gun makes quick and easy repairs possible to any kind of spectacle frames even considering the wide variety of frames there are.

This is particularly useful to the small repair workshops which can thus benefit from a tool that is cheap and handy like any type of tongs, pincers and similar instruments.

As the application of the invention have been described in as examples in no way limited to these it is understood that every equivalent application of the inventive concepts described and every product executed and/or in operation according to the characteristics of the invention, will be included within its field of protection.

I claim:

1. A manually operated pincer-gun utilizing an electric current source for heating metal hinges of thermoplastic eyeglass frames, comprising:

two hand grips of electrical insulating material and movable toward and away from each other;

two arms each rigidly connected with a respective hand grip and having an extremity, each of said extremities being electrically conductive;

two picking-up tips of electrically conductive material and each provided on the extremity of a respective arm two heating tips of electrically conductive material and each also provided on the extremity of a respective arm, said picking-up tips and said heating tips being arranged at different locations on said respective extremities and being spaced from one another and electrically connected to the respective extremities;

means for connecting said extremities and thereby said picking-up tips and said heating to an electric current source; and pivot means for connecting said hand grips to each other such that said hand grips together with the respective arms and their extremities are movable toward each other to enable said picking-up tips to engage one portion of a hinge to apply electric heating current thereto and enable said heating tips to contact another portion of the hinge to apply electric heating current thereto to heat the hinge and to soften an eyeglass frame around the hinge for insertion or extraction of the hinge, said two picking-up tips being formed as opposing tapered heads to be able to easily penetrate into eyeholes of the hinge, said two heating tips being formed as pins extended substantially parallel to each other to be able to be placed on bases of the hinges to be extracted.

2. The pincer-gun as defined in claim 1; further comprising a tip for extracting the hinges to be replaced and disposed at one of said extremities of one of said two arms and including a tooth having a sharp end extending perpendicularly outwardly from one of said two arms.

3. The pincer-gun as defined in claim 1; further comprising a tip for extracting the hinges to be replaced and disposed at one of said extremities of one of said two arms and including a sharp end extending perpendicularly outwardly from one of said two arms.

4. The pincer-gun as defined in claim 1 wherein and pivot means includes a pin.

5. The pincer-gun as defined in claim 1; further comprising spring means for biasing said hand grips in an open position.

6. The pincer-gun as defined in claim 1; further comprising a pedal switch connected to said connecting means and operated to close an electric circuit between said connecting means and an electric current source.

7. The pincer-gun as defined in claim 6; further comprising an electric transformer interconnected in the electric circuit and including a secondary circuit supplying the electric current to said connecting means.

8. The pincer-gun as defined in claim 7, wherein said extremities of said two arms are so shaped so as to avoid coming into contact with each other when said two heating tips lie on the base of the hinge to be extracted from the eyeglass frames so that the electric circuit is closed through the hinge itself instead of through said two arms.

9. The pincer gun as defined in claim 1, wherein said two picking up tips are disposed at an angle relative to said two heating tips.

10. The pincer gun as defined in claim 9, wherein, said angle is substantially 90°.

11. The pincer gun as defined in claim 1, wherein said two arms have a direction of closure in which said two picking up tips are disposed.

12. The pincer gun as defined in claim 1, wherein said two picking up tips are disposed at an angle relative to said two arms.

13. The pincer gun as defined in claim 12, wherein said angle is 90°.

* * * * *